(12) United States Patent
Cok

(10) Patent No.: US 6,865,550 B1
(45) Date of Patent: Mar. 8, 2005

(54) SYSTEM FOR SECURE DISTRIBUTION AND PLAYBACK OF DIGITAL DATA

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 521 days.

(21) Appl. No.: 09/498,379

(22) Filed: Feb. 3, 2000

(51) Int. Cl.$^7$ .............................................. G06F 17/60
(52) U.S. Cl. ........................................ 705/51; 380/277
(58) Field of Search ............. 705/50–52; 713/156–182; 380/200–201, 277–286, 44–47, 28–30

(56) References Cited

U.S. PATENT DOCUMENTS

| | | | | |
|---|---|---|---|---|
| 5,068,894 A | * | 11/1991 | Hoppe | 380/23 |
| 5,452,357 A | * | 9/1995 | Naccache | 380/25 |
| 5,715,403 A | * | 2/1998 | Stefik | 395/244 |
| 5,745,568 A | | 4/1998 | O'Connor et al. | |
| 5,870,470 A | * | 2/1999 | Johnson et al. | 380/6 |
| 5,926,624 A | * | 7/1999 | Katz et al. | 395/200.47 |
| 5,937,066 A | * | 8/1999 | Gennaro et al. | 380/21 |
| 5,956,408 A | | 9/1999 | Arnold | |
| 5,978,482 A | * | 11/1999 | Dwork et al. | 380/21 |
| 5,995,624 A | * | 11/1999 | Fielder et al. | 380/25 |
| 6,005,943 A | * | 12/1999 | Cohen et al. | 380/30 |
| 6,072,876 A | * | 6/2000 | Obata et al. | 380/286 |
| 6,170,060 B1 | * | 1/2001 | Mott et al. | 713/201 |
| 6,384,893 B1 | * | 5/2002 | Mercs et al. | 352/133 |

FOREIGN PATENT DOCUMENTS

EP 0 179 612 B1 8/1991

OTHER PUBLICATIONS

Boneh and Franklin, "An Efficient Public Key Traitor Tracing Scheme", 1999, Springer–Verlag, Berlin, Germany, ISBN 3 540 66347 9.*

U.S. Appl. No. 09/393,527, filed Sep. 10, 1999, by Ha et al., entitled "Hybrid Optical Recording Disc with Copy Protection".

* cited by examiner

*Primary Examiner*—James P. Trammell
*Assistant Examiner*—Mary Cheung
(74) *Attorney, Agent, or Firm*—Thomas H. Close

(57) ABSTRACT

A method and system for secure distribution and access to digital data, includes providing a plurality of system components; associating a plurality of unique identifiers with different components of the system; and controlling access by the system to the digital data based on a correspondence between the unique identifiers.

6 Claims, 3 Drawing Sheets

SYSTEM FOR SECURE DISTRIBUTION AND PLAYBACK OF DIGITAL DATA

FIELD OF THE INVENTION

The present invention relates to systems for the mass production and distribution of data, with or without encryption, and its decryption and playback by specially enabled machines utilizing a digital medium. More particularly, the present invention relates to digital playback devices and storage media with embedded identifiers which provide control of copying and playback.

BACKGROUND OF THE INVENTION

Digital data is extremely convenient and well-adapted to distribution and copying without loss of quality. These valuable features, however, are also a threat to those who own the digital data. In some businesses it is necessary to maintain strict control over the reproduction and playback of valuable data. For example, databases, imagery, music, and personal information are all highly valuable digital commodities to which the owners might wish to restrict access.

The distribution of digital media has long been subject to security concerns and the piracy of digital content is a significant problem. Software, audio, and video content are routinely stolen and illegally re-sold. While the information on these disks can be encrypted, the customized encryption and decryption of the data is generally impractical for economic reasons and the distribution of decryption keys to a mass market is generally impractical for logistical reasons.

Many encryption techniques are known in the art which address these issues to a limited extent. For example, encryption techniques for rendering digital information unreadable without first decrypting the information with the use of keys is well-known. Generally, techniques use either the same key to encrypt and decrypt or use one key to encrypt and a second to decrypt. It is possible to do this without the encrypter or decrypter knowing what the key of the other is. Regardless of the encryption technique, maintaining the security of the keys themselves is problematic as is their distribution.

It is useful to distribute digital data, such as audio, video, or digital films to a large number of recipients while maintaining strict control over the contents and access to the contents. Doing so reduces the economic losses to the owners of the data content. The difficulties in doing this can be categorized as media control, copy control, and playback control. Obviously, these issues are interrelated.

For example, U.S. Pat. No. 5,745,568, issued Apr. 28, 1998 to O'Connor et al., entitled "Method of Securing CD-ROM Data for Retrieval by One Machine," discloses a method for securing CD-ROM data for retrieval by a specified computer system. The data is encrypted with a hardware identifier as an encryption key. This identifier is associated with playback hardware and is used by the hardware to decrypt the data for playback.

This technique has several drawbacks for data having a large distribution. If a common encryption key for all instances of the data is used, access cannot be restricted to a sub-set of the hardware. If unique encryption for each data instance is used, a separate encryption step must be carried out on the data for each hardware playback device (or group of hardware devices with a common identifier). This encryption is tedious and costly; moreover, the management of the hardware identifiers at the data encryption site (i.e. key management) is problematic and a security risk. Secondly, this technique does not prevent unauthorized copying or playback of the information. Hence, an unscrupulous owner of two playback devices with a common identifier might copy the data and play it back in both machines while only having paid for the data once.

Moreover, once compromised, the hardware key is open to future exploitation with future data storage devices. Only by physically changing the hardware identifier can security be re-established.

Ha et al. in U.S. Ser. No. 09/393,527, filed Sep. 10, 1999, describe a method for controlling the copying of data sets on a mass-produced medium (Programmable Read-Only Memory for Compact Discs, or CD-PROM) by the use of software and disc identifiers adapted to authenticate a transferred program in the computer to permit the program to be operated by the computer. This technique does not prevent copying, per se, but rather inhibits the subsequent installation of copied software on computers through the use of disk identifiers which cannot normally be copied from disk to disk.

Again, the use of this invention for an application requiring a wide distribution and strict control over copying, access, and playback has some difficulties. For very high value data, the provision of the software identifier presents a security risk. If the media and the data identifiers are obtained illegally, there is no further protection for the data. Although a copy may not be installed on a computer (as described in the patent) it may well be played back an unlimited number of times in an unauthorized venue. In some applications, this may not be a problem, but in others (for example if the data is provided for public access or viewing) this is a serious problem. Although specially created machines adapted to copying, bit by bit, one CD-PROM to another might circumvent the disk identifier by copying it from one disk to another, the result will be of poor quality and available industry tools will not support it.

Moreover, this technique provides no control over the playback equipment. It may be desirable to limit access to the data to a particular set of playback machines to further enhance security. Finally, the technique makes no provision for encryption of the data and its subsequent decryption in a convenient way. Thus, someone who illegally obtains a data identifier and creates or modifies their own playback equipment may have unlimited access to the data and its playback.

There are many techniques known in the art for securely distributing computer software through insecure channels. Generally, these require encryption of the source data and using some variant of a public/private key technique for decryption and use. For example, U.S. Pat. No. 5,956,408, issued Sep. 21, 1999, to Arnold, entitled "Apparatus and Method for Secure Distribution of Data" describes privately encrypting software, distributing it, and then using the corresponding public key to decrypt it in a secure area within the destination computer.

Likewise, techniques for associating data with specific devices or addresses are known, for example, European Patent No. EP 0179612B11, granted Aug. 7, 1991 to Horn, entitled "Cryptographic System for Direct Broadcast Satellite Network." Such systems typically require local knowledge of the identifier which is encrypted to provide a receiver key in some fashion. These methods do not provide verification of source media or data (although content accuracy can be digitally verified using known validation techniques) or partition keys as described herein. Note that this patent does not describe or claim data validation techniques. Such techniques can be used in addition to those described herein to provide yet another level of security and guarantee of data integrity.

SUMMARY OF THE INVENTION

There is a need therefore for an improved distribution method for digital data that avoids the security of content and control of playback problems noted above with respect to the prior art.

This need is met according to the present invention by a method and system for secure distribution and access to digital data, that includes providing a plurality of system components; associating a plurality of unique identifiers with different components of the system; and controlling access by the system to the digital data based on a correspondence between the unique identifiers. According to a further aspect of the invention, these identifiers can be complemented with encryption/decryption capabilities by encrypting data with a common key but decrypting with a multi-part key embedded in the medium, playback device, and any other pertinent system components. When the medium is placed within a playback device, the device will access the medium, data, and playback identifiers and only proceed with data playback if the identifiers correspond. Decryption and playback can proceed if all pieces of the multi-part decryption key are correct.

The present invention has the advantage of providing a mechanism for the secure distribution of mass-produced digital data in a secure and cost-effective way. Low-cost data replication is readily used while an extremely fine control of playback is possible. The approach is also resistant to theft and illegal playback.

DETAILED DESCRIPTION OF THE INVENTION

Figure 1:
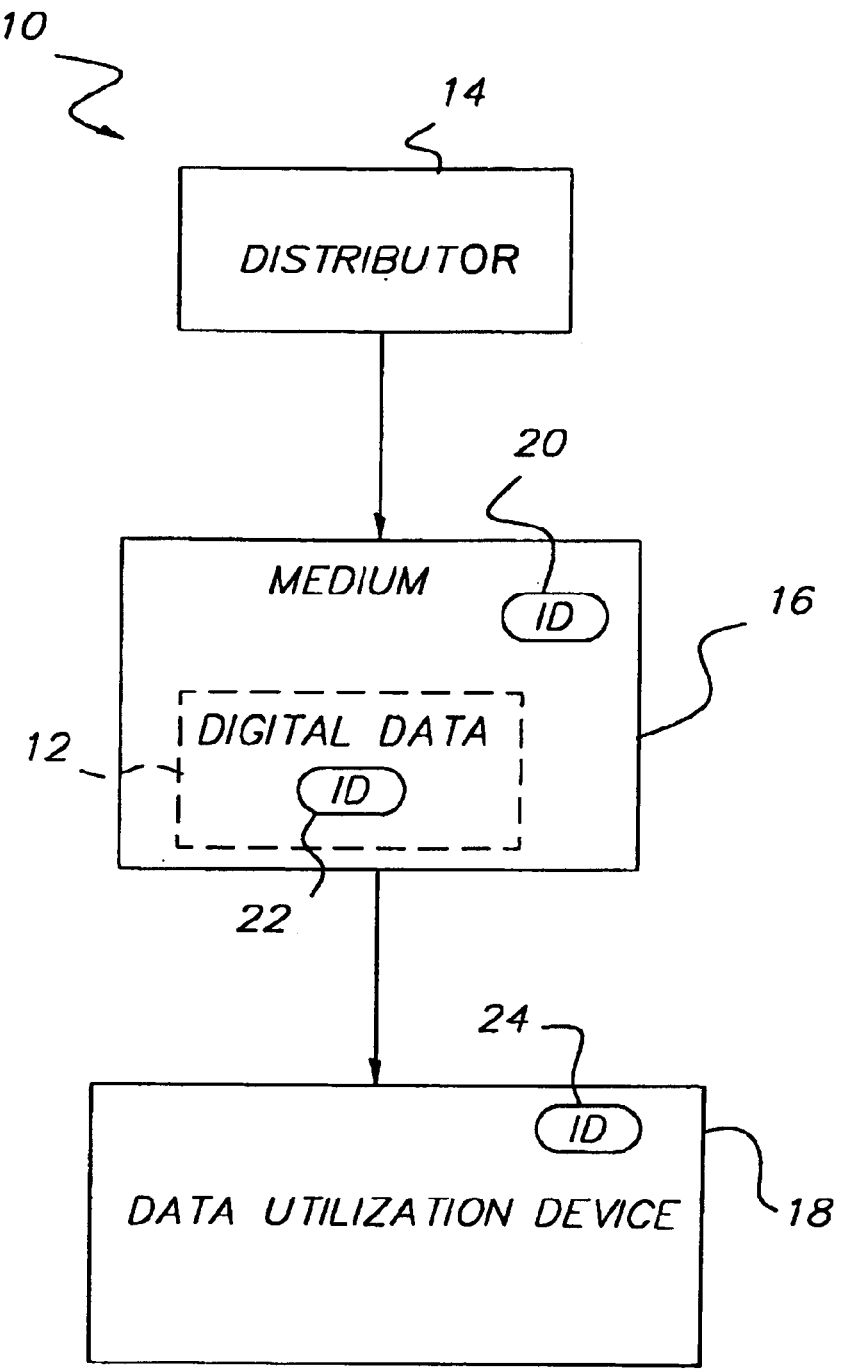
FIG. 1 is a block diagram showing a generic system for secure distribution and access to digital data according to the present invention.

The foregoing problems associated with the distribution and use of valuable digital data may be overcome by utilizing identifiers and encryption for controlling their access, replication, and playback. Referring to FIG. 1, a generalized system 10 for distribution of digital data 12 includes a distributor 14, a distribution medium 16, and a data utilization device 18. A plurality of unique identifiers are associated with a corresponding plurality of system components. For example, in the event that the medium is a physical medium, such as an optical disc, a unique medium identifier 20 is carried on the medium. A unique data identifier 22 is embedded within the digital data, and a unique device identifier 24 is associated within the data utilization device. These unique identifiers are used to control data access as will be described below. Encryption can be employed to further enhance the security of the system. According to one embodiment of the invention, the identifiers are validated by a transferring a validation program or instructions from the media to the playback device.

In one embodiment wherein the medium is a read only medium, such as a compact disc bearing digital data, and many copies of the disc are to be made, the system operates as follows. The digital data is written or otherwise fixed into the read-only digital medium. The unique medium identifier medium which can be a sub-code or other fixed identifier uniquely specifying the medium and is generally not copied when the medium contents are copied. A unique data identifier is then embedded in the digital data, using any well known data embedding process, and the data including the embedded identifier is written onto each disc. The medium identifier may be known only to the manufacturer of the medium whereas the data identifier may be known only to the data owner.

The disc is then sent to the purchaser who may own a number of playback devices. Each playback device has within it a unique playback device identifier (the playback device identifier may be unique to the owner who may have several of the playback devices, each containing the owner's unique device identifier). This identifier may be known only to the owner of the playback devices or, since the identifier can be buried within the hardware of the device, may be transparent to the owner. Since the playback devices are likely to be moved, sold, or exchanged, it is preferable that the identifier be capable of modification (with difficulty) and not be directly hardwired into the components and unalterable.

The purchaser then inserts the medium into the playback device for data retrieval, access, or display. The playback device accesses the medium and identifiers. The playback device first establishes that the medium, data, and playback identifiers correspond in a predetermined fashion and then proceeds to playback the data. Note that to enhance security, the unique identifiers should correspond in some fashion but not be identical. If the medium, data, and devices identifiers do not correspond in the predetermined fashion, the playback device will be incapable of correctly reading and outputting the data.

This technique obviates the need to separately communicate an identifier to the owner along with the data. Indeed, the owner need not be aware of the unique data identifier or its construction, thus enhancing security. If a copy of the data bearing medium is created (without a copy of the medium identifier), the data cannot be played back. Moreover, if either the data or medium identifiers are illegally obtained, the security of the system is maintained if a playback device having a non-corresponding device identifier is used. If all identifiers and the hardware playback device are compromised, future security may be re-established by changing the identifiers attached to new data or media.

Figure 2:
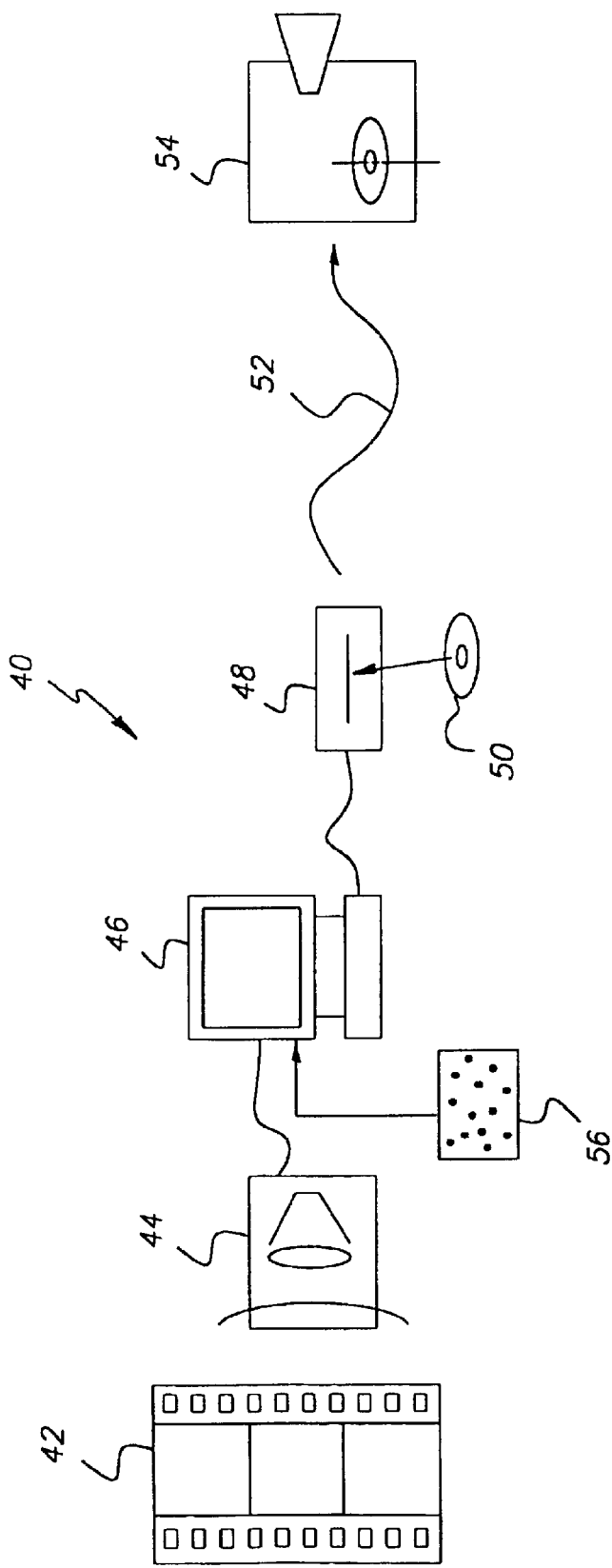
FIG. 2 is a block diagram showing an embodiment of the system present invention using film, optical disks, and a digital projector without including encryption.

As an example of the foregoing, FIG. 2 illustrates a system 40 wherein digitized film 42 that is scanned 44 by a computer 46 and written with a disk writer 48 upon an optical disk 50. Embedded within the digital content is a coded data identifier which can be extracted without harming the integrity of the data. Stored within the sub-codes of the optical disk is a medium identifier. The disk with its content are then sent via a distribution channel 52 to a purchaser who owns a digital projector 54 or other playback device. Within the projector is a device identifier. The projector has the capability to read all three identifiers, determine if they correspond, and to access and playback the data if they do or to return a suitable error if they do not. The determination of correspondence is a matter of preference for each system.

As a simple example of correspondence, each identifier could be the same arbitrary string of alphanumeric characters. The playback device merely need compare them and proceed if they are identical. As noted above, however, this technique does not provide much security. If only one identifier is obtained, the others are also found. A more complex approach is to make two of the identifiers very large prime numbers. The third number can be the product of the first two. The playback device must multiply the two prime numbers together and establish that their product matches the third number. (As is well known, factoring large numbers is difficult. Hence, this approach provides a greater degree of security. Moreover, this approach can be readily extended by using more large prime numbers.) In this case, if two of the identifiers are obtained, the third can be found. Yet another approach is to incorporate a table as one of the identifiers (or, as described below, part of a transferred instruction), the second is the entry number, and the third is the table entry. The playback device performs the lookup and tests whether the numbers correspond. While this is less secure, it is a practical way to support a large number of customers.

Other examples of content suitable for this invention include music, multi-media presentations, and the like. Storage devices can include optical disks (CD-ROMS, DVD, etc.) as well as magnetic tapes, disks, or other magnetic media. Distribution can include physical shipment of the media or, indeed, utilize broadcast mechanisms such as telecommunications, satellite, local area networks, corporate networks, land-lines, the Internet, etc. Access devices can include traditional computers, CD players, video players, DVD players, digital projectors, etc. Note that if electronic distribution is used, an identifier suitable to the medium may not be available and the system will rely upon only the remaining data and device identifiers. This may also be the case for read/write media in which an identifier cannot be conveniently placed. Some media may utilize medium identifiers not subject to copying, others may not. The extent to which these are used is dependent on the desired attributes of the entire system.

In a further implementation, the digital data can contain instructions or a transferred program 56 (FIG. 2) for matching the identifiers. These instructions, executed by the access device, then provide an additional layer of security in that if a particular set of identifiers, media, and playback devices are compromised, the instructions can be altered to inhibit use of the compromised devices. Moreover, the instructions themselves can also be used to provide or prevent compatibility with existing data standards. For example, recognized data format identifiers (such as headers and file names) can be suppressed, or masked, so that only the transferred program can recognize them. Alternatively, the program can be instructed to allow direct access to the data. Note that this does not inhibit copying the medium, only its playback via the transferred program. If an access device that does not rely on the transferred program is created or ignores the identifiers, it can access the data if the data is stored in a recognized format. Alternatively, if a physical replica of the medium is created (including the identifier), the transferred program will not be able to detect the medium as a replica.

Hence, the security of the system can be enhanced with the application of encryption using a multi-part decryption key conceptually similar to the multiple identifiers described above. Indeed, the keys can be the same information as the identifiers, but need not be. It is important to note that the efficient manufacture of the medium together with the digital data requires that the same data be written on every disk.

Figure 3:
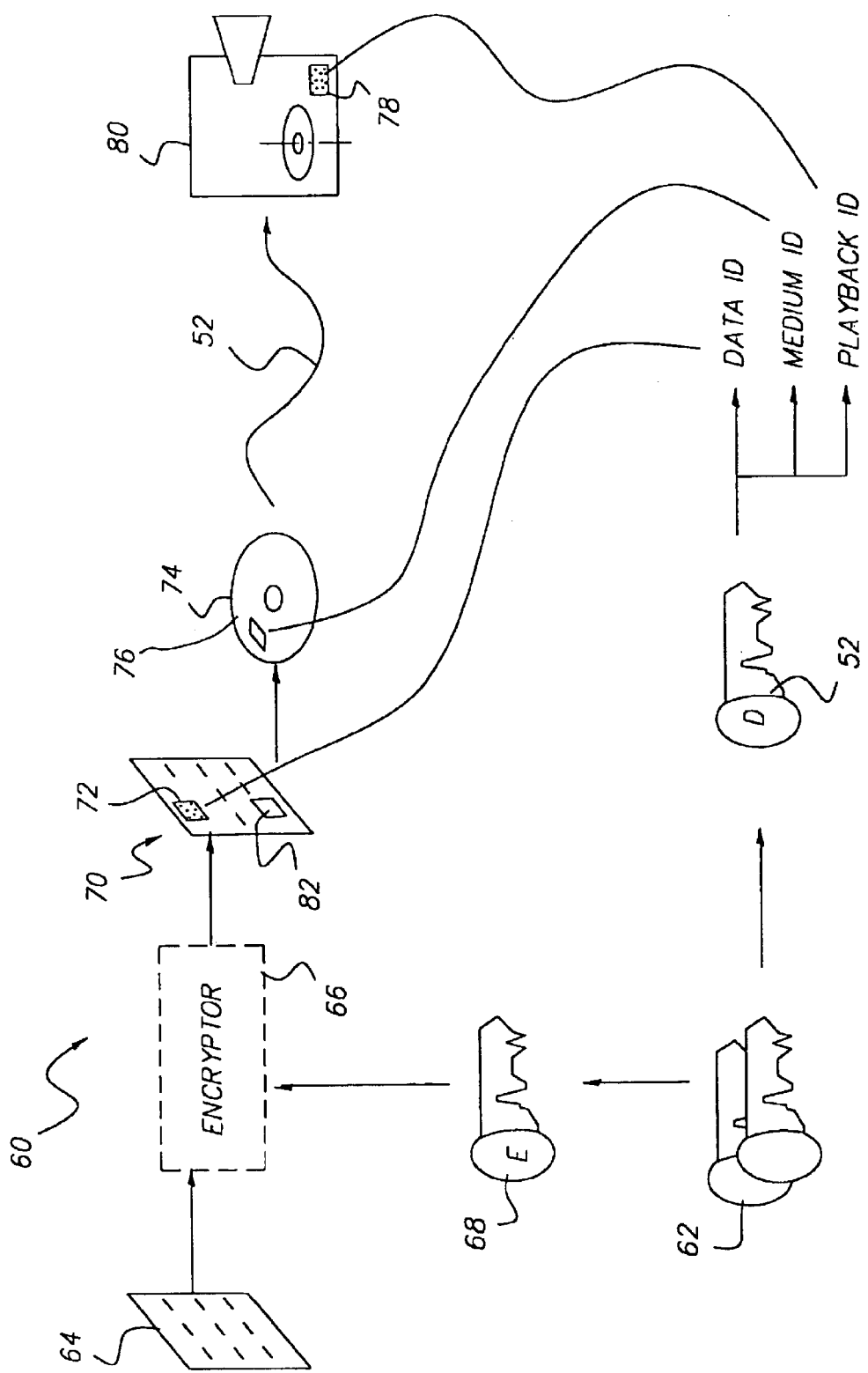
FIG. 3 is a block diagram showing an embodiment of the system of the present invention identifiers and encryption.

When encryption is also used, FIG. 3 illustrates the operation of the system 60. First, an encryption key set 62 is chosen such that one or more complementary decryption keys can exist, each of which can be divided into multiple parts or identifiers. The digital data 64 is then encrypted 66 using the encryption key 68 to produce an encrypted data file 70 with an embedded identifier (or partial decryption key) called the data key 72. The encrypted data 70 is then written or otherwise fixed into all copies of the medium 74 on which the data is to be distributed. Onto each copy of the medium 74 on which the data is to be distributed is then written an identifier including one part of the decryption key (the medium key) 76. Another part can be encoded into the medium (the medium key) 76 and yet a third (the playback key) 78 is fixed in the playback device 80, either at manufacture or set-up. Each key set is associated with a customer. The data is then distributed 52 to the customers. The medium 74 is inserted into the playback device 80 by the customer. The playback device accesses the partial keys, combines them, decrypts the data, and plays it.

Note that the system as described can actually include more (or fewer) partial keys. Each component in the system for which security is required can be associated with a partial key as long as there is a communication mechanism transferring the partial key information to the playback device. The accessing playback device then combines all relevant keys to enforce a secure access to the data. For example, a projectionist might be supplied with an identifier which must be entered into the system. The identifier is evaluated with the other component identifiers and playback continues only if the identifiers correspond. Alternatively, fewer key portions or identifiers can be used thereby simplifying the system but reducing the security. Moreover, for further security, the keys or identifiers themselves can be hidden within the data, medium, or playback device by further encrypting them, distributing them among other data elements, dividing them into pieces and storing them in multiple locations, etc.

The identifiers associated with the various system components can encode more information than simply the partial decryption key and this additional information can be used to further circumscribe the use of the data. For example, an expiration or start date can be encoded such that the playback device is incapable of reading or decrypting the data after or before a certain date has passed. Other limitations can also be encoded, such as number of times played, etc.

Again, as with the identifiers, additional security can be integrated into the system by including a transferred program or instructions 82 (FIG. 3) in the digital data which is accessed and executed by the playback device. This allows future changes to be made to the security arrangements and also increases security by keeping the validation mechanism separate from the actual playback hardware. It is a matter of preference whether the instructions are actually included in the digital data itself or simply separately resident on the medium. Hiding the instructions in the data or encrypting it may improve security but limits the scope of the instructions.

The use of multi-part keys or identifiers reduces the risk of compromising the data. If any of the identifiers or keys is stolen, the system will still not support playback. Only in the case in which a playback device and the corresponding data storage medium are stolen, will the data playback be compromised. In this case, the invention also supports future security, in that the data storage device manufacturer can simply stop producing storage media with the key portion that corresponds to the stolen playback device. Hence, future media will not be compromised. An alternative key portion can be used that will then not work with a transferred program, that is, the transferred program can be instructed to ignore a certain, compromised data key.

The advantages of this approach are that the wide distribution of valuable, copyrighted data can be achieved while reducing the risk of illegal use of the data. As described, this technique can inhibit playback of the data using conventional devices by inhibiting access to the content. Copying the media is inhibited by requiring the recognition of media and data identifiers that are not readily transferred from one medium to another. Control over access is established by requiring corresponding data, medium, and playback device identifiers.

Data security is established by encryption. Manufacturing efficiency is obtained by using a common encryption key. Decryption key security is established by dividing the key into multiple parts, each embedded into a different device (for example, the medium itself and the playback device).

Additional security is maintained through the use of a transferred program or instructions that reduce the availability of the validation mechanisms in the hardware devices themselves. This also provides additional flexibility in application and future extensions or modifications.

Thus, large digital data files can be written to media, manufactured at low cost, and distributed with great security. If the medium is stolen, it cannot be used nor can any illegal copies of the medium. If the playback device is stolen, it can only be used with a specific medium, which will be unavailable except to the legitimate owner. If both the medium and the playback device are stolen, they can only be used together. In this case, selecting a different data key or changing identifiers secures future data content.

Alternative implementations of the basic approach are also viable. For example, the device identifier does not necessarily have to be embedded within a playback device but could be distributed to it via a network either by a central computer controlled by the owner of the playback device or by the manufacturer of the media. Distribution via the Internet is also feasible. Controlling mechanisms within the playback device or transferred program could be time dependent or based on other external factors, allowing an even finer control of the playback of the data. Thus the technique is not only useful for preventing piracy but for controlling and enforcing legitimate use.

The invention has been described in detail with particular reference to certain preferred embodiments thereof, but it will be understood that variations and modifications can be effected within the spirit and scope of the invention.

Parts List 10 system for distribution of digital data
12 digital data
14 distributor
16 distribution medium
18 data utilization device
20 unique medium identifier
22 unique data identifier
24 unique device identifier
40 system for distribution of digital film data
42 film
44 scan step
46 computer
48 disk writer
50 optical disk
52 distribution channel
54 digital projector
56 program
60 system for distribution of encrypted digital data
62 encryption key set
64 digital data
66 encryption step
68 encryption key
70 encrypted digital data
72 embedded data identifier
74 medium
76 medium key
78 playback key
80 playback device
82 transferred program

What is claimed is:

1. A method for secure distribution and access to digital data, comprising:

a) providing an encryption key set having an encryption key and a decryption key that can be divided into multiple parts, each part of which is associated with a component of a secure distribution system;

b) encrypting the digital data with the encryption key to produce encrypted digital data;

c) supplying the encrypted digital data along with a first part of the decryption key that is associated with the digital data to a playback device;

d) supplying a second part of the decryption key that is associated with the playback device to the playback device; and e) combining the parts of the decryption keys in the playback device and using the combined decryption key to decrypt the encrypted digital data.

2. The method claimed in claim 1, wherein the digital data and the first part of the decryption key is supplied to the playback device on a medium, and further comprising the steps of embedding a third part of the decryption key that is associated with the medium in the medium.

3. A system for secure distribution and access to digital data, comprising:

a) a plurality of system components;

b) an encryption key set having an encryption key and a decryption key that can be divided into multiple parts, wherein a part of the decryption key is associated with each of the system components;

c) means for encrypting the digital data using the encryption key; and d) means for receiving and combining the parts of the decryption key and decrypting the encrypted digital data.

4. The system claimed in claim 3, wherein the system components include the digital data, and a playback device, and wherein the playback device includes the means for receiving and combining the parts of the decryption key and decrypting the encrypted digital data.

5. The system claimed in claim 4, wherein the part of the decryption key associated with the digital data is embedded in the digital data, and the part of the decryption key associated with the playback device is stored in the playback device.

6. The system claimed in claim 5, wherein the system components further include a digital data medium on which is recorded one of the parts of the decryption key associated with the digital data medium.

* * * * *